United States Patent
Roy et al.

(10) Patent No.: US 12,353,874 B2
(45) Date of Patent: Jul. 8, 2025

(54) EFFICIENT CONFIGURATION MANAGEMENT IN CONTINUOUS DEPLOYMENT

(71) Applicant: Dell Products L.P., Round Rock, TX (US)

(72) Inventors: Amitava Roy, Lexington, MA (US); Robert Ballantyne, Mansfield, MA (US); Muhamad Djunaedi, Northborough, MA (US)

(73) Assignee: Dell Products L.P., Round Rock, TX (US)

( * ) Notice: Subject to any disclaimer, the term of this patent is extended or adjusted under 35 U.S.C. 154(b) by 229 days.

(21) Appl. No.: 17/975,995

(22) Filed: Oct. 28, 2022

(65) Prior Publication Data
US 2024/0143318 A1    May 2, 2024

(51) Int. Cl.
*G06F 8/65* (2018.01)
*G06F 8/71* (2018.01)
*G06F 9/445* (2018.01)

(52) U.S. Cl.
CPC .................. *G06F 8/71* (2013.01); *G06F 8/65* (2013.01); *G06F 9/44505* (2013.01)

(58) Field of Classification Search
CPC ..... G06F 8/60; G06F 8/65; G06F 8/71; G06F 9/44505; G06F 9/50
See application file for complete search history.

(56) References Cited

U.S. PATENT DOCUMENTS

| | | | |
|---|---|---|---|
| 2021/0055947 A1* | 2/2021 | Mahajan | G06F 9/45558 |
| 2021/0365272 A1* | 11/2021 | Mansour | G06F 8/60 |
| 2022/0114174 A1* | 4/2022 | Glass | G06F 9/44505 |

OTHER PUBLICATIONS

A. Mark Burgess, "Continuous Integration of Data Histories into Consistent Namespaces," Mar. 20, 2022, arXiv, retrieved online Mar. 7, 2025. Retrieved from the Internet: <URL: https://arxiv.org/pdf/2204.00470> (Year: 2022).*

* cited by examiner

*Primary Examiner* — Hanh Thi-Minh Bui
(74) *Attorney, Agent, or Firm* — Krishnendu Gupta; Lesley Leonessa

(57) ABSTRACT

Methods, system, and non-transitory processor-readable storage medium for efficient software configuration management system in a continuous deployment environment are provided herein. An example method includes monitoring, by a continuous deployment module, configuration deployment file changes in a software configuration management system, where the software configuration management system comprises a source repository and a target platform. The continuous deployment module detects modification of a configuration deployment file on the source repository, and deploys at least one microservice application on the target platform based on a directory in the source repository in which the modified configuration deployment file was detected.

19 Claims, 5 Drawing Sheets

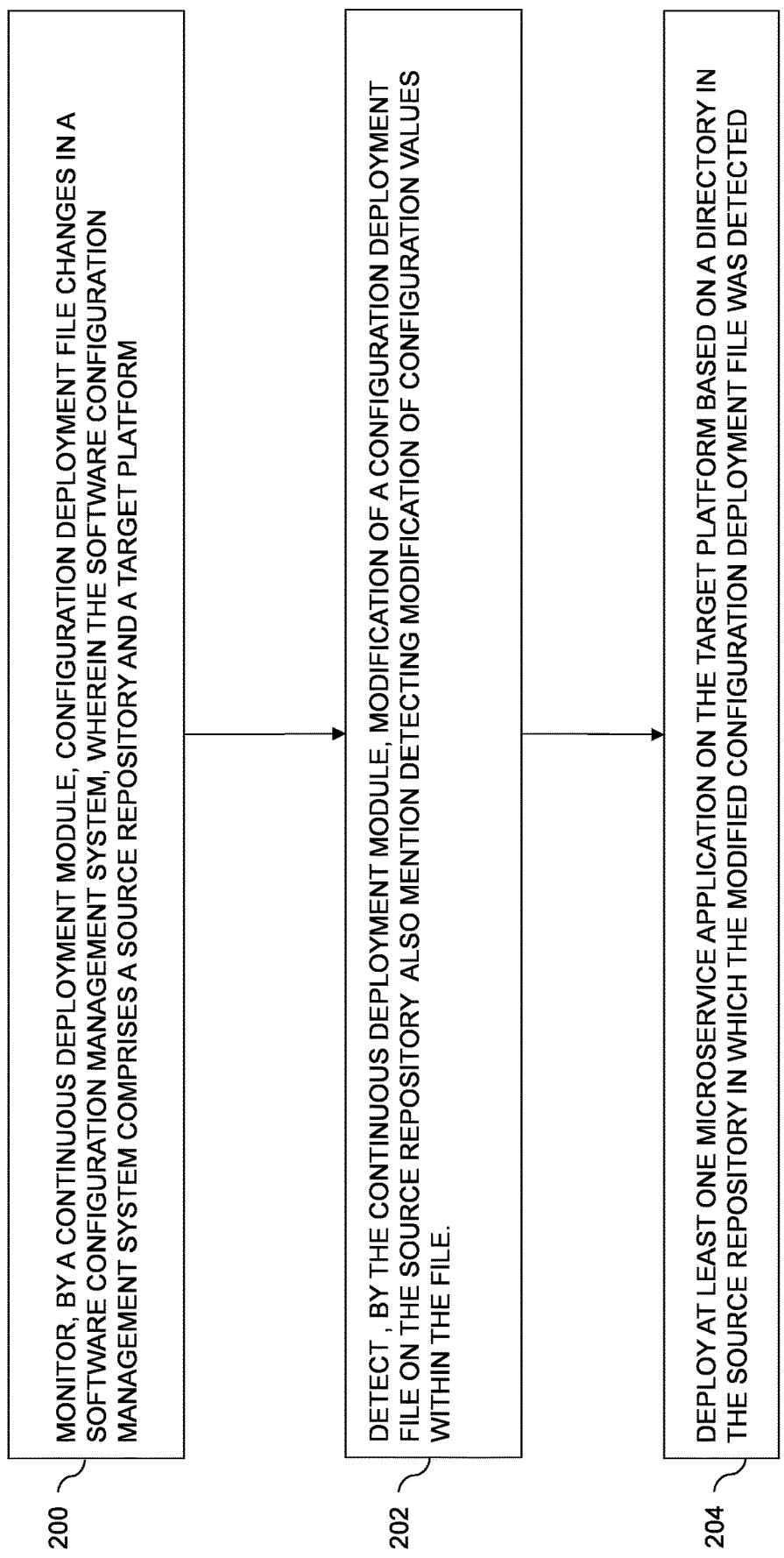

EFFICIENT CONFIGURATION MANAGEMENT IN CONTINUOUS DEPLOYMENT

FIELD

The field relates generally to information processing techniques and more particularly, to the processing of software code in such systems.

BACKGROUND

A number of techniques exist for monitoring configuration deployment file changes in a software configuration management system. Continuous deployment software monitors configuration changes in configuration deployment files and synchronizes those changes with applications running on a target platform.

SUMMARY

Illustrative embodiments provide techniques for implementing an efficient software configuration management system in a continuous deployment environment. For example, illustrative embodiments monitor, by a continuous deployment module, configuration deployment file changes in a software configuration management system, where the software configuration management system comprises a source repository and a target platform. The continuous deployment module detects modification of a configuration deployment file on the source repository, and deploys at least one microservice application on the target platform based on a directory in the source repository in which the modified configuration deployment file was detected.

Illustrative embodiments provide techniques for implementing an efficient software configuration management system in a continuous deployment environment. For example, illustrative embodiments receive, by a continuous deployment module in a software configuration management system, instructions to deploy a microservice application. A configuration manager creates a dictionary comprising a plurality of configuration map objects. The continuous deployment module deploys the microservice application in the software configuration management system, where the microservice application mounts at least one configuration map object from the plurality of configuration map objects.

Other types of processing devices can be used in other embodiments. These and other illustrative embodiments include, without limitation, apparatus, systems, methods and processor-readable storage media.

BRIEF DESCRIPTION OF THE DRAWINGS

FIG. 2A shows a flow diagram of a process for a software configuration management system in an illustrative embodiment.

DETAILED DESCRIPTION

Figure 1:
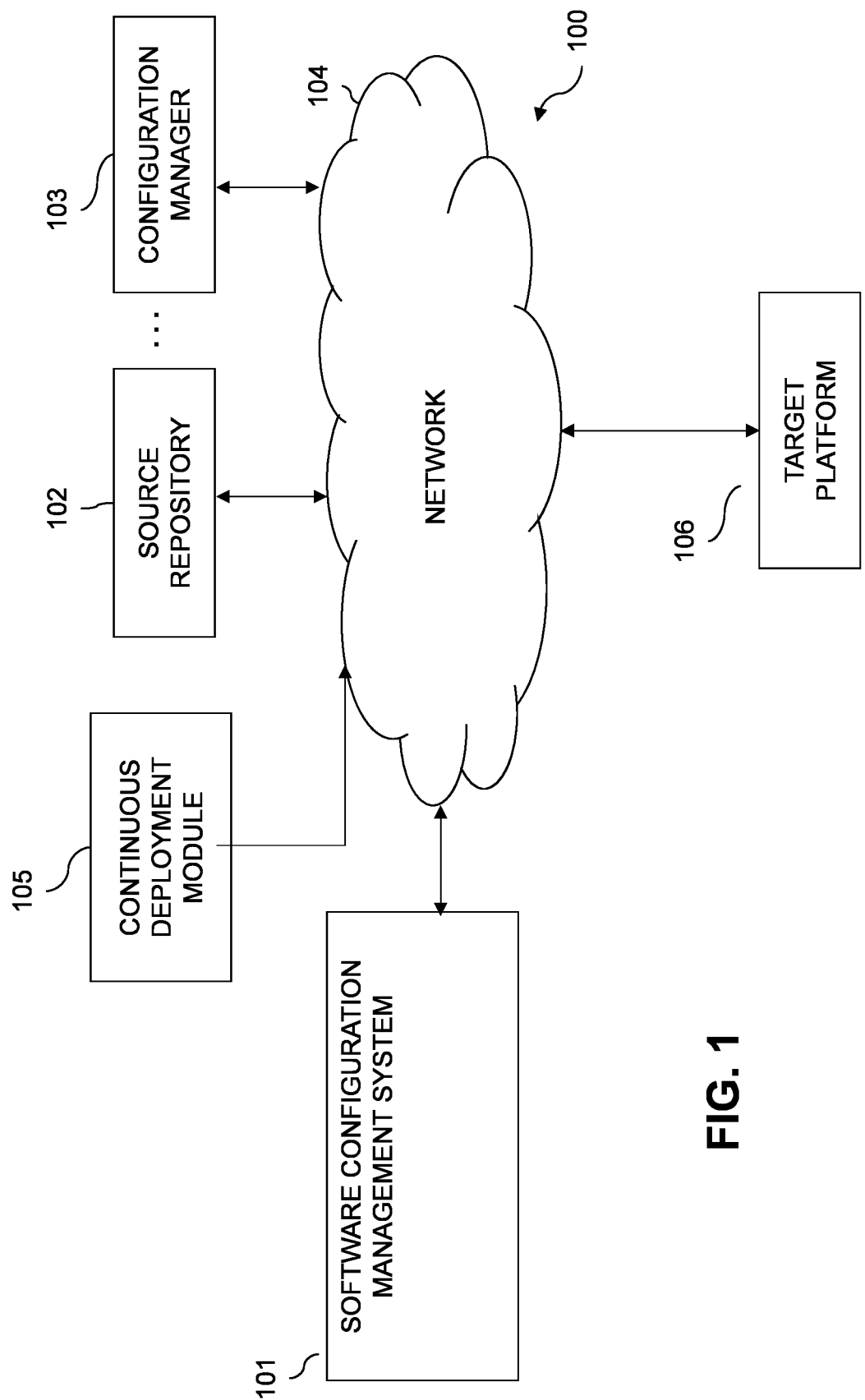
FIG. 1 shows an information processing system including a software configuration management system in an illustrative embodiment.

Illustrative embodiments will be described herein with reference to exemplary computer networks and associated computers, servers, network devices or other types of processing devices. It is to be appreciated, however, that these and other embodiments are not restricted to use with the particular illustrative network and device configurations shown. Accordingly, the term "computer network" as used herein is intended to be broadly construed, so as to encompass, for example, any system comprising multiple networked processing devices.

Described below is a technique for use in implementing a software configuration management system, which technique may be used to provide, among other things, efficient configuration management in continuous deployment in a software testing lifecycle system. The continuous deployment module monitors configuration deployment file changes in a software configuration management system, where the software configuration management system comprises a source repository and a target platform. The continuous deployment module detects modification of a configuration deployment file on the source repository, and deploys at least one microservice application on the target platform based on a directory in the source repository in which the modified configuration deployment file was detected.

In an enterprise, one or more groups can deploy and run applications for multiple other groups. For example, a business unit within a company may deploy, manage, and run the Continuous Integration/Continuous Deployment (CI/CD) microservices for multiple other business units. Each microservice deployment takes its own configuration (i.e., configuration values, such as a set of name, value pairs) as an input, which configures the microservice appropriately. The configuration of a microservice can be divided into different groups including, but not limited to, global configurations, group configurations, single group configurations and/or single microservice configurations.

Conventional technologies for managing microservices maintain a configuration map object (i.e., configmap object) for each instance of a microservice running in each business unit, thus requiring any changes to the configuration map object be propagated to each instance of the microservice. Conventional technologies use a single monolithic configuration for each microservice. As a result, if a configuration value is shared across multiple microservices, multiple deployment files need to be updated if that configuration value changes. Conventional technologies copy the same configurations across multiple directories, which become cumbersome to manage at scale. Conventional technologies face a challenge when managing the configurations for each business unit, particularly when the number of business units and the number of microservices are large. For example, when global configuration deployment files are replicated in each business unit, any change in a global value needs to be made in multiple deployment files in the software configuration management system. The same challenge is present for other categories of configurations, whether that be a single instance of a microservice, microservices that only run in one business unit, microservices that run across multiple business units, etc. Scripts can be written to propagate the same change to multiple locations, but that requires additional logic to maintain and may be error-prone, especially if the script fails.

By contrast, in at least some implementations in accordance with the current technique as described herein, efficient configuration management is optimized by maintaining a single copy of each configuration map representation on a repository such as GitHub. A continuous deployment application monitors any changes on GitHub. When a change is detected in a configuration deployment file on GitHub, the changes to the configuration map representation are pulled from GitHub and used to create a configuration map object that is used by a microservice. Thus, deployment configurations are kept "DRY" ("Don't Repeat Yourself") such that changing a configuration value representation in a single deployment file (meaning updating the single copy) affects only the relevant configuration deployments in, for example, a Kubernetes cluster, and therefore, only the relevant microservices need to restart/reload the configuration in the Kubernetes cluster. In other words, configmap representations need to be updated only in a single location, yet those changes will take effect in multiple applications across multiple namespaces for multiple business units. Additionally, only the relevant configmap objects are updated and only the relevant microservices need to be restarted due to the configmap representation changes.

Efficient configuration management is optimized by monitoring, by a continuous deployment module, configuration deployment file changes in a software configuration management system, where the software configuration management system comprises a source repository and a target platform. The continuous deployment module detects modification of a configuration deployment file on the source repository, and deploys at least one microservice application on the target platform based on a directory in the source repository in which the modified configuration deployment file was detected.

Thus, a goal of the current technique is to provide a method and a system for providing an efficient configuration management system that facilitates configuration management by monitoring changes in deployment files, and deploying microservices while keeping the deployment files "DRY". Another goal is to update a single deployment file and/or a configmap representation and affect only the relevant microservice applications across multiple namespaces for multiple business units.

In at least some implementations in accordance with the current technique described herein, the use of a software configuration management system can provide one or more of the following advantages: manage modification of configurations at scale, keep deployment files "DRY", update a single deployment file and affect only the relevant microservice applications, deploy the same configurations across multiple business units, and minimize updating of multiple files whenever a configuration value is changed.

In contrast to conventional technologies, in at least some implementations in accordance with the current technique as described herein, efficient configuration management is optimized by monitoring, by a continuous deployment module, configuration deployment file changes in a software configuration management system, where the software configuration management system comprises a source repository and a target platform. The continuous deployment module detects modification of a configuration deployment file on the source repository, and deploys at least one microservice application on the target platform based on a directory in the source repository in which the modified configuration deployment file was detected.

In an example embodiment of the current technique, the software configuration management system determines which microservice applications to deploy and business units in which to deploy the microservice applications based on the directory in the source repository in which the modified configuration deployment file was detected.

In an example embodiment of the current technique, the software configuration management system determines at least one microservice application to deploy based on whether one or more microservice applications utilize the modified configuration values.

In an example embodiment of the current technique, the software configuration management system restarts at least one deployed microservice application upon detecting, by the continuous deployment module, modification of a configuration deployment file on the source repository.

In an example embodiment of the current technique, the software configuration management system overwrites configuration values in a configuration deployment file, and restarts at least one deployed microservice application upon detecting, by the continuous deployment module, modification of the configuration deployment file on the source repository.

In an example embodiment of the current technique, the software configuration management system creates the global directory on the source repository for all global microservice applications deployed on the target platform.

In an example embodiment of the current technique, the source repository comprises group directories comprising group configuration values for group microservice applications, and a plurality of group microservice applications deployed in a business unit each utilize a common group configuration value.

In an example embodiment of the current technique, the software configuration management system creates a group directory on the source repository for each business unit in which microservice applications are deployed.

In an example embodiment of the current technique, the source repository comprises single group directories comprising single group configuration values for single group microservice applications, and a single group microservice application deployed in a business unit utilizes a single group configuration value.

In an example embodiment of the current technique, the source repository comprises single microservice application directories comprising single microservice application configuration values for single microservice applications, and a plurality of single microservice applications deployed in a plurality of business units each utilize a common single microservice application configuration value.

In an example embodiment of the current technique, the software configuration management system creates a single microservice application directory on the source repository for each microservice application deployed.

In an example embodiment of the current technique, the continuous deployment module creates deployment applications on the target platform for each business unit in which microservice applications are deployed.

In an example embodiment of the current technique, the continuous deployment module points each deployment application to a respective configmap representation on the source repository, where the configmap representation comprises the configuration values, and deploys the deployment application in a namespace on the target platform.

In an example embodiment of the current technique, the continuous deployment module creates a microservice application in the namespace, where the microservice application mounts the configmap object, to access the configuration values embedded within the configmap object.

In an example embodiment of the current technique, the continuous deployment module creates a business unit global application to monitor a global directory for changes to the global directory.

In an example embodiment of the current technique, the continuous deployment module creates a business unit group application to monitor a group directory for changes to the group directory.

In an example embodiment of the current technique, the continuous deployment module creates a single group application to monitor a single group directory for changes to the single group directory.

Described below is a technique for use in implementing a software configuration management system, which technique may be used to provide, among other things, efficient configuration management in continuous deployment in a software testing lifecycle system by joining configurations. The continuous deployment module receives instructions to deploy a microservice application. A configuration manager creates a dictionary comprising a plurality of configuration map objects. The continuous deployment module deploys the microservice application in the software configuration management system, where the microservice application mounts at least one configuration map object from the plurality of configuration map objects.

During development, microservice application developers need to be aware of how the configuration values are split and which values belong to which deployment object to enable the microservice application developer to read the value from it. For example, a global configuration value will belong to the global configmap object, whereas a group configuration value will be found in the group configmap object. This can be described as the splitting of configurations. The microservice application developer needs to know how configurations are split to load and use them during runtime. Thus, the splitting of configurations, as described above needs to have a corresponding joining of configurations.

In at least some implementations in accordance with the current technique as described herein, efficient configuration management in continuous deployment in a software testing lifecycle system using the joining of configurations is achieved by receiving, by a continuous deployment module, instructions to deploy a microservice application. A configuration manager creates a dictionary comprising a plurality of configuration map objects. The continuous deployment module deploys the microservice application in the software configuration management system, where the microservice application mounts at least one configuration map object from the plurality of configuration map objects.

Thus, a goal of the current technique is to facilitate microservice application development when using deployment files that have been split to keep them "DRY". Another goal is to provide flexibility to overwrite one configuration file with another.

In at least some implementations in accordance with the current technique described herein, the use of efficient configuration management in a continuous deployment system can provide one or more of the following advantages: facilitate microservice application development when using configurations that have been split among multiple configuration files, and provide flexibility to overwrite one configuration file with another.

In contrast to conventional technologies, in at least some implementations in accordance with the current technique as described herein, efficient configuration management in continuous deployment in a software testing lifecycle system is optimized by receiving, by a continuous deployment module, instructions to deploy a microservice application. A configuration manager creates a dictionary comprising a plurality of configuration map objects. The continuous deployment module deploys the microservice application in the software configuration management system, where the microservice application mounts at least one configuration map object from the plurality of configuration map objects.

In an example embodiment of the current technique, a configuration manager merges a plurality of configuration map objects for a plurality of microservice applications into the dictionary.

In an example embodiment of the current technique, the configuration manager detects a conflict between at least two of the plurality of configuration map objects, and resolves the conflict by overwriting at least one of the two or more configuration map objects with another of the two or more configuration map objects.

In an example embodiment of the current technique, the configuration manager detects a new configuration map object has been loaded into the software configuration management system, and adds the new configuration map object to the dictionary.

In an example embodiment of the current technique, the configuration manager inserts a configuration key into the dictionary, where the configuration map object comprises the configuration key and a value.

In an example embodiment of the current technique, the configuration manager receives a file containing the value, where the file is named according to the configuration key.

In an example embodiment of the current technique, the configuration manager receives a second file containing the value, where the second file is named according to the configuration key, and overwrites the file with the second file based on a naming convention associated with the file and the second file.

In an example embodiment of the current technique, the naming convention is defined that determines the second file can overwrite the file.

In an example embodiment of the current technique, the confirmation manager nests the key into the dictionary according to a naming convention associated with a file containing the configuration value.

In an example embodiment of the current technique, the configuration manager nests the key according to a hierarchy, where the file name specifies the hierarchy, where the filename comprises delimited named tiers of the hierarchy.

In an example embodiment of the current technique, the configuration manager inserts
the configuration key at a root level in the dictionary based on the file name.

In an example embodiment of the current technique, the microservice application mounts the configuration map object specific to the microservice application.

FIG. 1 shows a computer network (also referred to herein as an information processing system) 100 configured in accordance with an illustrative embodiment. The computer network 100 comprises a software configuration management system 101, continuous deployment module 105, source repository 102, configuration manager 103, and target platform 106. The software configuration management system 101, continuous deployment module 105, source repository 102, configuration manager 103, and target platform 106 are coupled to a network 104, where the network 104 in this embodiment is assumed to represent a subnetwork or other related portion of the larger computer network 100. Accordingly, elements 100 and 104 are both referred to herein as examples of "networks," but the latter is assumed to be a component of the former in the context of the FIG. 1 embodiment. Each of software configuration management system 101, continuous deployment module 105, source repository 102, configuration manager 103, and target platform 106 may reside on a storage system. Such storage systems can comprise any of a variety of different types of storage including network-attached storage (NAS), storage area networks (SANs), direct-attached storage (DAS) and distributed DAS, as well as combinations of these and other storage types, including software-defined storage.

Each of the software configuration management system 101, continuous deployment module 105, source repository 102, configuration manager 103, and target platform 106 may comprise, for example, servers and/or portions of one or more server systems, as well as devices such as mobile telephones, laptop computers, tablet computers, desktop computers or other types of computing devices. Such devices are examples of what are more generally referred to herein as "processing devices." Some of these processing devices are also generally referred to herein as "computers."

The software configuration management system 101, continuous deployment module 105, source repository 102, configuration manager 103, and target platform 106 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Also associated with the software configuration management system 101 are one or more input-output devices, which illustratively comprise keyboards, displays or other types of input-output devices in any combination. Such input-output devices can be used, for example, to support one or more user interfaces to the software configuration management system 101, as well as to support communication between the software configuration management system 101 and other related systems and devices not explicitly shown. For example, a dashboard may be provided for a user to view a progression of the execution of the software configuration management system 101. One or more input-output devices may also be associated with any of the continuous deployment module 105, source repository 102, configuration manager 103, and target platform 106.

Additionally, the software configuration management system 101 in the FIG. 1 embodiment is assumed to be implemented using at least one processing device. Each such processing device generally comprises at least one processor and an associated memory, and implements one or more functional modules for controlling certain features of the software configuration management system 101.

More particularly, the software configuration management system 101 in this embodiment can comprise a processor coupled to a memory and a network interface.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

The network interface allows the software configuration management system 101 to communicate over the network 104 with the continuous deployment module 105, source repository 102, configuration manager 103, and target platform 106 and illustratively comprises one or more conventional transceivers.

A software configuration management system 101 may be implemented at least in part in the form of software that is stored in memory and executed by a processor, and may reside in any processing device. The software configuration management system 101 may be a standalone plugin that may be included within a processing device.

It is to be understood that the particular set of elements shown in FIG. 1 for the software configuration management system 101 involving the continuous deployment module 105, source repository 102, configuration manager 103, and target platform 106 of computer network 100 is presented by way of illustrative example only, and in other embodiments additional or alternative elements may be used. Thus, another embodiment includes additional or alternative systems, devices and other network entities, as well as different arrangements of modules and other components. For example, in at least one embodiment, one or more of the software configuration management system 101, continuous deployment module 105, source repository 102, configuration manager 103, and target platform 106 can be on and/or part of the same processing platform.

An exemplary process of software configuration management system 101 in computer network 100 will be described in more detail with reference to, for example, the flow diagram of FIG. 2A.

FIG. 2A is a flow diagram of a process for execution of the software configuration management system 101 in an illustrative embodiment. It is to be understood that this particular process is only an example, and additional or alternative processes can be carried out in other embodiments.

At 200, the continuous deployment module 105 monitors configuration deployment file changes in the software configuration management system 101. The software configuration management system 101 comprises the source repository 102 and the target platform 106. In an example embodiment, the continuous deployment module 105 is a continuous deployment/delivery tool, such as ArgoCD, for Kubernetes applications, the target platform 106 is a system, such as Kubernetes, for automating deployment, scaling, and management of containerized applications, and the source repository 102, such as GitHub, that takes DevOps best practices used for application development. In an example embodiment, in continuous deployment in a Kubernetes cluster, a continuous deployment tool, such as ArgoCD, is leveraged to monitor the configuration deployment file changes in GitHub, and deploy the updated configuration in the Kubernetes cluster. In an example embodiment, Kubernetes configmap representations are created in GitHub for various types of configmap objects.

In a global microservice, the configuration value (i.e., the global configuration value) is the same across all microservice deployments, across all business units. For example, a global configuration value may be in the format of "key1: value1". Business unit A and business unit B may each have deployed an instance of two microservices, microservice1 and microservice2. In this example scenario, there will be four deployed instances of microservices, microservice1A, microservice2A, microservice1B, and microservice2B. The configuration value "key1: value1" will be the same across all four deployed instances microservice1A, microservice2A, microservice1B, and microservice2B. In an example embodiment, the source repository comprises a global directory comprising global configuration values for global microservice applications, where a plurality of global microservice applications deployed across a plurality of business units each utilize a common global configuration value.

The following diagram illustrates which microservices are affected by changes in global configuration values, assuming that, in this example scenario, all the microservices use the same configuration. In this diagram below, Bill references business unit 1 and BU2 references business unit 2. The "X" indicates which microservices are affected by changes in the configuration values.

| Global configuration | | |
| --- | --- | --- |
| | BU1 | BU2 |
| microservice1 | X | X |
| microservice2 | X | X |

In an example embodiment, the source repository 102 comprises a global directory comprising global configuration values for global microservice applications, where a plurality of global microservice applications deployed across a plurality of business units each utilize a common global configuration value. In an example embodiment, the global directories comprise some of the configuration deployment files that are monitored by the continuous deployment module 105. In an example embodiment, the software configuration management system 101 creates the global directory on the source repository for all global microservice applications deployed on the target platform. In an example embodiment, the continuous deployment module 105 creates a business unit global application to monitor the global directory for changes to the global directory. The business unit global application monitors the global directory and deploys the configmap objects in the business unit namespace. For each business unit, there will be one such application. The source of the application is the global directory (or a file), and the target is the business unit specific namespace in the Kubernetes cluster. The source of the application may also be a file. This enables ArgoCD to update the Kubernetes object, corresponding to the global configuration under multiple namespaces, one for each business unit, if there is a global configuration change. Thus, this is how the continuous deployment module 105 deploys at least one deployed microservice application (or restarts/reloads at least one deployed microservice application), based on which configmap representation was modified and which microservice accesses the configuration values provided to the configmap object via the configmap representation. It should be noted that a deployed microservice application may be restarted or reloaded.

In an example embodiment, in a group microservice, the configuration value (i.e., the group configuration value) is the same for all instances of a microservice, for example, microservice1, microservice2, etc. deployed within a single business unit. In an example embodiment, each of microservice1 and microservice2 running in business unit 1 uses a configuration value of "key3:value31". The configuration value will be different for different business units, for example, the configuration value for business unit 1 is "key3:value31" and the configuration value for business unit 2 is "key3:value32". The configuration values will be the same for each microservice deployed within a given business unit.

The following diagram illustrates which microservices are affected by changes in group configuration values, assuming that, in this example scenario, all the microservices use the same configuration. In this diagram below, Bill references business unit 1 and BU2 references business unit 2. The "X" indicates which microservices are affected by changes in the configuration values.

| Group configuration | | |
| --- | --- | --- |
| | BU1 | BU2 |
| microservice1 | X | |
| microservice2 | X | |

In an example embodiment, the source repository 102 comprises group directories comprising group configuration values for group microservice applications, where a plurality of group microservice applications deployed in a business unit each utilize a common group configuration value. In an example embodiment, the group directories comprise some of the configuration deployment files that are monitored by the continuous deployment module 105. In an example embodiment, the software configuration management system 101 creates a group directory on the source repository for each business unit in which microservice applications are deployed. In an example embodiment, the continuous deployment module 105 creates a business unit group application to monitor the group directory for changes to the group directory. The business unit group application monitors business unit specific group directories, and synchronizes the configmap representation on GitHub with the corresponding configmap object in the business unit group directory on the Kubernetes namespace. For each business unit, there is one such application.

In an example embodiment, in a single group microservice, the configuration value (i.e., the single group configuration value) is the same across all microservice instances of a single microservice, deployed across multiple business units, for example, business unit 1, business unit 2, . . . business unit N, etc. In an example embodiment, if the single group configuration value is changed, all instances of the microservice across all business units will be affected.

The following diagram illustrates which microservices are affected by changes in single group configuration values, assuming that, in this example scenario, all the microservices use the same configuration. In this diagram below, BU1 references business unit 1 and BU2 references business unit 2. The "X" indicates which microservices are affected by changes in the configuration values.

| Single group configuration | | |
|---|---|---|
| | BU1 | BU2 |
| microservice1 | X | X |
| microservice2 | | |

In an example embodiment, the source repository 102 comprises single group directories comprising single group configuration values for single group microservice applications, where a single group microservice application deployed in a business unit utilizes a single group configuration value. In an example embodiment, the single group directories comprise some of the configuration deployment files that are monitored by the continuous deployment module 105.

In an example embodiment, the continuous deployment module 105 creates a single group application to monitor the single group directory for changes to the single group directory. For each microservice, there is a single group business application that monitors the single group directory and deploys the microservice related configmap object, and the microservice in the business unit namespace. For example, business unit microservice application 1 monitors the business unit microservice 1 directory on GitHub, and deploys the microservice 1 configmap object and also the microservice 1 in the business unit namespace.

In an example embodiment, in a single microservice, the configuration value (i.e., single configuration value) is specific to a single microservice deployment within a single business unit. For example, business unit 1 may run an instance microservice1 of a microservice and business unit 2 may run an instance microservice2 of the same microservice. Both instances may use the same configuration value, for example, "key1:value1". However, the value1 can be changed for each microservice instance without affecting the other microservice instance.

The following diagram illustrates which microservices are affected by changes in single configuration values, assuming that, in this example scenario, all the microservices use the same configuration. In this diagram below, BU1 references business unit 1 and BU2 references business unit 2. The "X" indicates which microservices are affected by changes in the configuration values.

| Single instance configuration | | |
|---|---|---|
| | PG1 | PG2 |
| uS1 | X | |
| uS2 | | |

In an example embodiment, the source repository 102 comprises single microservice application directories comprising single microservice application configuration values for single microservice applications, where a plurality of single microservice applications deployed in a plurality of business units each utilize a common single microservice application configuration value. In an example embodiment, the software configuration management system 101 creates a single microservice application directory on the source repository 102 for each microservice application deployed. In an example embodiment, the single microservice application directories comprise some of the configuration deployment files that are monitored by the continuous deployment module 105. In an example embodiment, a single microservice application may be used for debug purposes.

At 202, the continuous deployment module 105 detects modification of a configuration deployment file on the source repository. The configuration deployment file may contain a configmap representation. In an example embodiment, the continuous deployment module 105 detects modification of a configmap representation, where the configmap representation comprises a configuration key and a configuration value. In an example embodiment, when the continuous deployment module 105 detects modification of a configuration deployment file on the source repository, the continuous deployment module 105 restarts at least one deployed microservice application, based on which configmap representation was modified and which microservice accesses the configuration values provided to the configmap object via the configmap representation. Thus, changing a configuration deployment file and/or a configmap representation will restart only the necessary microservices which need to be restarted and not any of the microservices that do not need to be restarted.

In an example embodiment, configuration values in a configuration deployment file may be overwritten. The continuous deployment module 105, upon detecting modification of the configuration deployment file on the source repository 102 restarts one or more deployed microservice applications based on whether one or more microservice applications utilize the configuration values in the modified configuration deployment file. In other words, when a continuous deployment tool, such as ArgoCD detects changes in a configuration deployment file, ArgoCD deploys the updated configuration in the Kubernetes cluster, and if necessary, restarts the microservices in the Kubernetes cluster to use the updated configuration values. In this example scenario, any changes to configuration values will require a restart/re-load to only the affected microservices, leaving the remaining microservices to run/execute as usual.

At 204, the software configuration management system 101 deploys at least one microservice application on the target platform 106 based on a directory in the source repository in which the modified configuration deployment file was detected. In an example embodiment, the software configuration management system 101 determines which microservice applications to deploy and business units in which to deploy the microservice applications based on the directory in the source repository in which the modified configuration deployment file was detected.

In an example embodiment, the modification of the configuration deployment file comprises modification of configuration values. In this example scenario, the software configuration management system 101 determines at least one microservice application to deploy based on whether microservice applications utilize the modified configuration values.

In an example embodiment, the continuous deployment module 105 creates deployment applications on the target platform for each business unit in which microservice applications are deployed. In an example embodiment, the continuous deployment module 105 maintains the state of the source repository 102 and the target platform 106 synchronized. For example, the continuous deployment module 105 may be an ArgoCD application that monitors the source repository 102. In this example scenario, the target platform 106 is a Kubernetes namespace, and the ArgoCD application creates the Kubernetes objects specified in the source repository 102. Thus, the ArgoCD application updates the Kubernetes object in the target namespace when any file on the source repository 102 is updated, to keep the source repository 102 and Kubernetes namespace synchronized.

In an example embodiment, the continuous deployment module 105 points each deployment application to a respective configmap representation on the source repository where the configmap representation comprises the configuration values. The continuous deployment module 105 then deploys the deployment application in a namespace on the target platform. In an example embodiment, each ArgoCD application points to a configmap representation on the source repository 102, such as GitHub, and creates a corresponding Kubernetes configmap object in the relevant Kubernetes cluster namespace/location, as specified by the ArgoCD application. In an example embodiment, the continuous deployment module 105 creates a microservice application in the namespace, where the microservice application mounts the configmap object, to access the configuration values (i.e., key, value) embedded within the configmap object. In an example embodiment, relevant microservice applications, running in the Kubernetes cluster, mounts the Kubernetes configmap object to access the configuration values stored in the configmap object.

Accordingly, the particular processing operations and other functionality described in conjunction with the flow diagram of FIG. 2A are presented by way of illustrative example only, and should not be construed as limiting the scope of the disclosure in any way. For example, the ordering of the process steps may be varied in other embodiments, or certain steps may be performed concurrently with one another rather than serially.

Figure 2B:
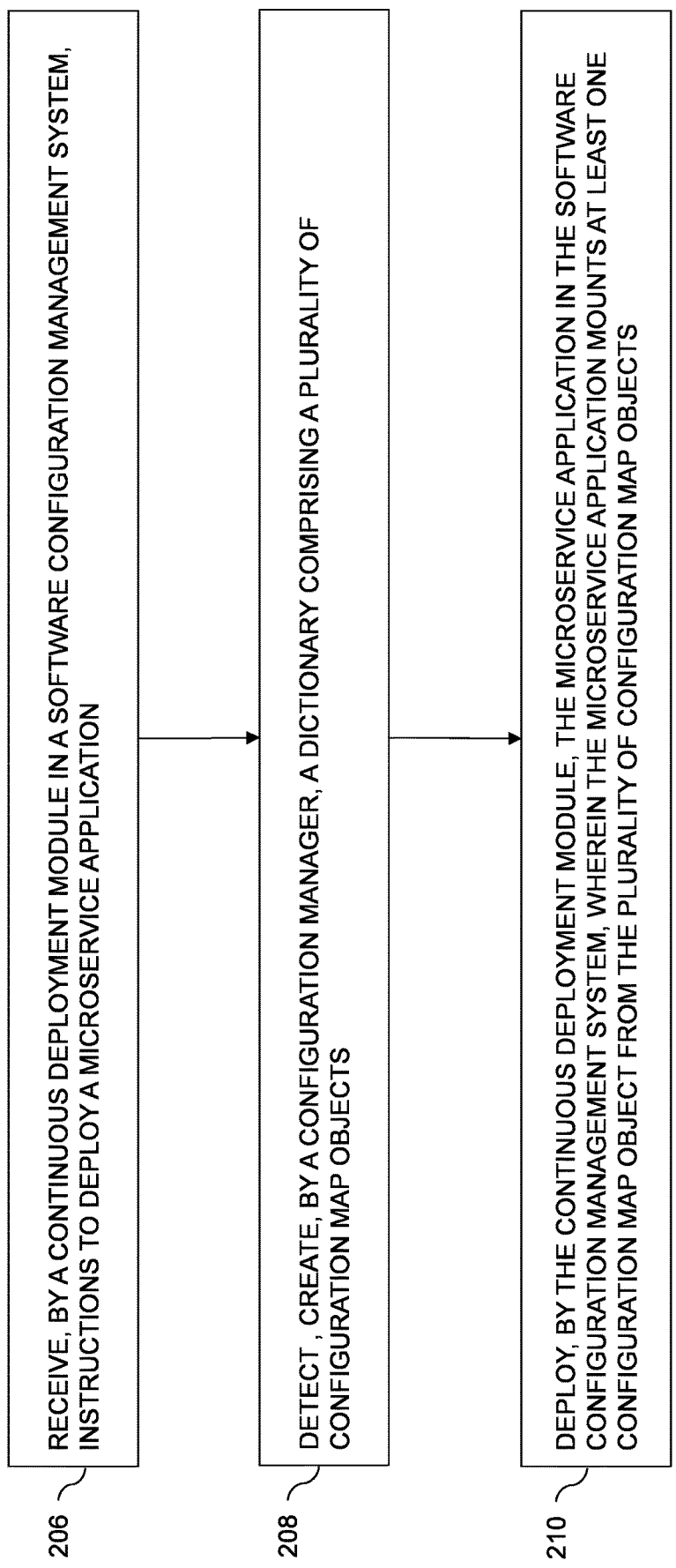
FIG. 2B shows a flow diagram of a process for a software configuration management system using a dictionary of configuration map objects in an illustrative embodiment.

FIG. 2B shows a flow diagram of a process for a software configuration management system using a dictionary of configuration map objects in an illustrative embodiment.

At 206, the continuous deployment module 105 in the software configuration management system 101 receives instructions to deploy a microservice application. As noted above, the continuous deployment module 105 monitors changes to deployment configuration files on the source repository 102, and deploys microservice applications (or restarts/reloads deployed microservice application), based on which configmap representation was modified in the configuration deployment file(s), and which microservices access the configuration values provided to the configmap object via the configmap representation. In an example embodiment, in the beginning of a microservice application run, a configuration manager 103 is called to create a single dictionary of configmap objects.

At 208, a configuration manager 103 creates a dictionary comprising a plurality of configuration map objects. In an example embodiment, the configuration manager 103 joins multiple configuration map objects to product a single dictionary for the microservice application to use. The configuration manager 103 contains logic to create and merge configuration map objects to produce a single dictionary. After the single dictionary (i.e., "the dictionary") is created, the microservice application works with the single dictionary as if the microservice application has loaded a single configmap object.

In an example embodiment, the configuration manager 103 merges a plurality of configuration map objects for a plurality of microservice applications into the dictionary. In an example embodiment, the configuration manager 103 detects a new configuration map object has been loaded into the software configuration management system, and adds the new configuration map object to the single dictionary.

In an example embodiment, the configuration manager 103 inserts a configuration key into the dictionary, where the configuration map object comprises the configuration key and a value. As noted above, configuration value may be in the format of "key: value". In an example embodiment, the configuration manager 103 receives a file containing the value, where the file is named according to the configuration key. For example, a file may be created, such as a *.yml file (i.e., a human-readable data format used for data serialization), where the name of the file is the name of the configuration key and the content of the file is the value. Thus, "Kafka.yml" contains the value for the Kafka configuration key. In an example embodiment, the file may be a j son, j sonnet, any type of configuration file, etc.

In an example embodiment, the configuration manager 103 detects a conflict between at least two of the plurality of configuration map objects, and resolves the conflict by overwriting at least one of the two or more configuration map objects with another of the two or more configuration map objects. In an example embodiment, the configuration manager 103 defines the naming convention that determines the second file can overwrite the file. For example, each file may be prepended with a natural number, where a filename having a higher number can overwrite a file having a lower number prepended. Or, in another example embodiment, a filename having a lower number can overwrite a file having a higher number prepended.

In an example embodiment, the configuration manager 103 receives a second file containing the configuration value, where the second file is named according to the configuration key, and overwrites the file with the second file based on the naming convention associated with the file and the second file. For example, a file named 1.Kafka.yml may overwrite a conflicting file named 2.Kafka.yml. Both files named "Kafka" indicate both files provide a value for the "Kafka" key, and this is why the files are considered to be "conflicting". Or, depending on how the naming convention is defined, 2.Kafka.yml may overwrite a conflicting file named 1.Kafka.yml. In another example embodiment, the configuration manager 103 overwrites the content of the file with the content of the second file where the content of the second file matches the content of the file.

In an example embodiment, a configuration file that supplies a global configuration value may be prepended with the number "1", and a configuration file that supplies a single microservice configuration value may be prepended with the number "2", and a configuration file that supplies a group configuration value may be prepended with the number "3", meaning that a global configuration file may overwrite a single microservice configuration file which may, in turn, overwrite a group configuration file. The ability to overwrite one file with another provides flexibility to the software configuration management system 101.

In an example embodiment, when the configuration manager 103 inserts the configuration key into the dictionary, the configuration manager 103 nests the key into the dictionary according to a naming convention associated with a file containing the configuration value. For example, a business unit may need to inject a new "key:value" pair under an existing key, provided by a configuration, instead of creating a new configuration object just for that "key:value" pair. In an example embodiment, the configuration manager 103 nests the key according to a hierarchy, where the file name specifies the hierarchy, where the filename comprises delimited named tiers of the hierarchy. For example, a configuration file named consumen.json may be nested in the single dictionary within the Kafka key by naming the configuration file Kafka.consumen.json. Thus, when the configuration manager 103 creates the dictionary, the consumer key will be nested within the Kafka key.

In an example embodiment, the configuration manager 103 inserts the configuration key at a root level in the dictionary based on the file name. For example, a configuration key in a file named configroot.json will be placed at the root level within the dictionary. In an example embodiment, the name "configroot" is a reserved name and cannot be used as part of a longer name.

At 210, the continuous deployment module 105 deploys the microservice application in the software configuration management system, where the microservice application mounts at least one configuration map object from the plurality of configuration map objects. In an example embodiment, the microservice application mounts the configuration map object (i.e., the configmap object), where the configmap object is obtained from the single dictionary. In an example embodiment, as noted above, the microservice application mounts the configuration map object specific to the microservice application.

Accordingly, the particular processing operations and other functionality described in conjunction with the flow diagram of FIG. 2B are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to optimize efficient configuration management by maintaining a single copy of each configuration map representation on GitHub, and facilitate developers of microservice applications when using configurations that have been split among multiple configuration files. Embodiments disclosed herein manage modification of configurations at scale. Embodiments disclosed herein keep deployment files "DRY". Embodiments disclosed herein update a single deployment file and affect only the relevant microservice applications. Embodiments disclosed herein deploy the same configurations across multiple business units, and minimize updating of multiple files whenever a configuration value is changed. Embodiments disclosed herein provide flexibility to overwrite one configuration file with another.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the information processing system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 3 and 4. Although described in the context of the information processing system 100, these platforms may also be used to implement at least portions of other information processing systems in other embodiments.

Figure 3:
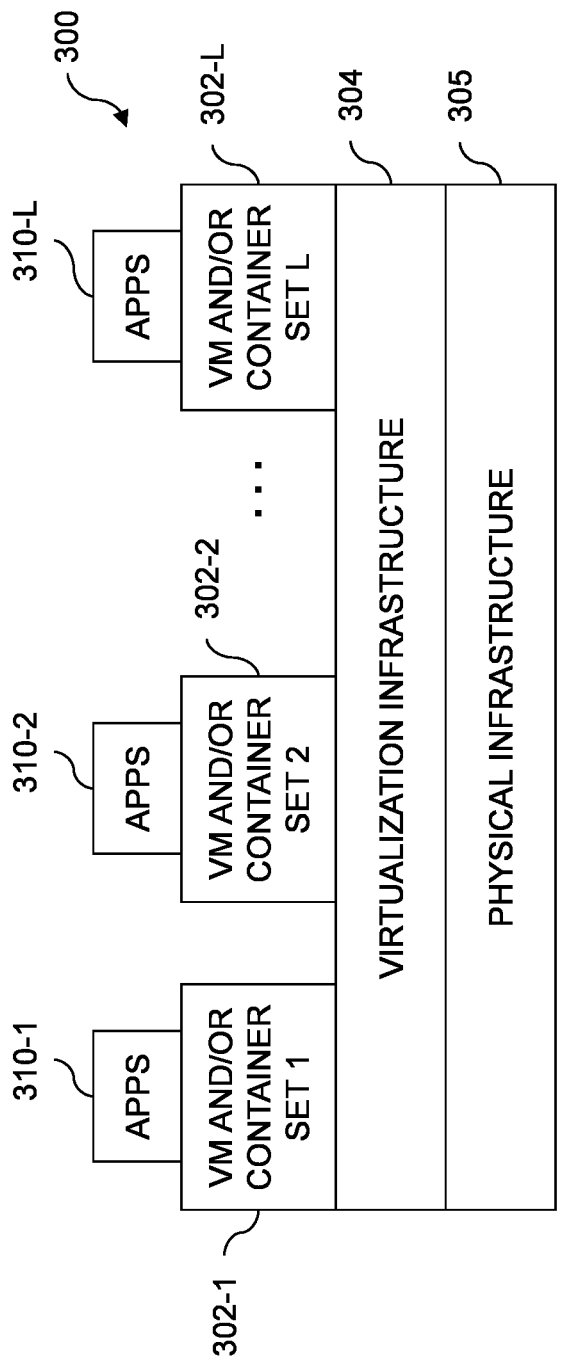
FIGS. 3 and 4 show examples of processing platforms that may be utilized to implement at least a portion of a software configuration management system embodiments.

FIG. 3 shows an example processing platform comprising cloud infrastructure 300. The cloud infrastructure 300 comprises a combination of physical and virtual processing resources that are utilized to implement at least a portion of the information processing system 100. The cloud infrastructure 300 comprises multiple virtual machines (VMs) and/or container sets 302-1, 302-2, . . . 302-L implemented using virtualization infrastructure 304. The virtualization infrastructure 304 runs on physical infrastructure 305, and illustratively comprises one or more hypervisors and/or operating system level virtualization infrastructure. The operating system level virtualization infrastructure illustratively comprises kernel control groups of a Linux operating system or other type of operating system.

The cloud infrastructure 300 further comprises sets of applications 310-1, 310-2, . . . 310-L running on respective ones of the VMs/container sets 302-1, 302-2, . . . 302-L under the control of the virtualization infrastructure 304. The VMs/container sets 302 comprise respective VMs, respective sets of one or more containers, or respective sets of one or more containers running in VMs. In some implementations of the FIG. 3 embodiment, the VMs/container sets 302 comprise respective VMs implemented using virtualization infrastructure 304 that comprises at least one hypervisor.

A hypervisor platform may be used to implement a hypervisor within the virtualization infrastructure 304, where the hypervisor platform has an associated virtual infrastructure management system. The underlying physical machines comprise one or more distributed processing platforms that include one or more storage systems.

In other implementations of the FIG. 3 embodiment, the VMs/container sets 302 comprise respective containers implemented using virtualization infrastructure 304 that provides operating system level virtualization functionality, such as support for Docker containers running on bare metal hosts, or Docker containers running on VMs. The containers are illustratively implemented using respective kernel control groups of the operating system.

Figure 4:
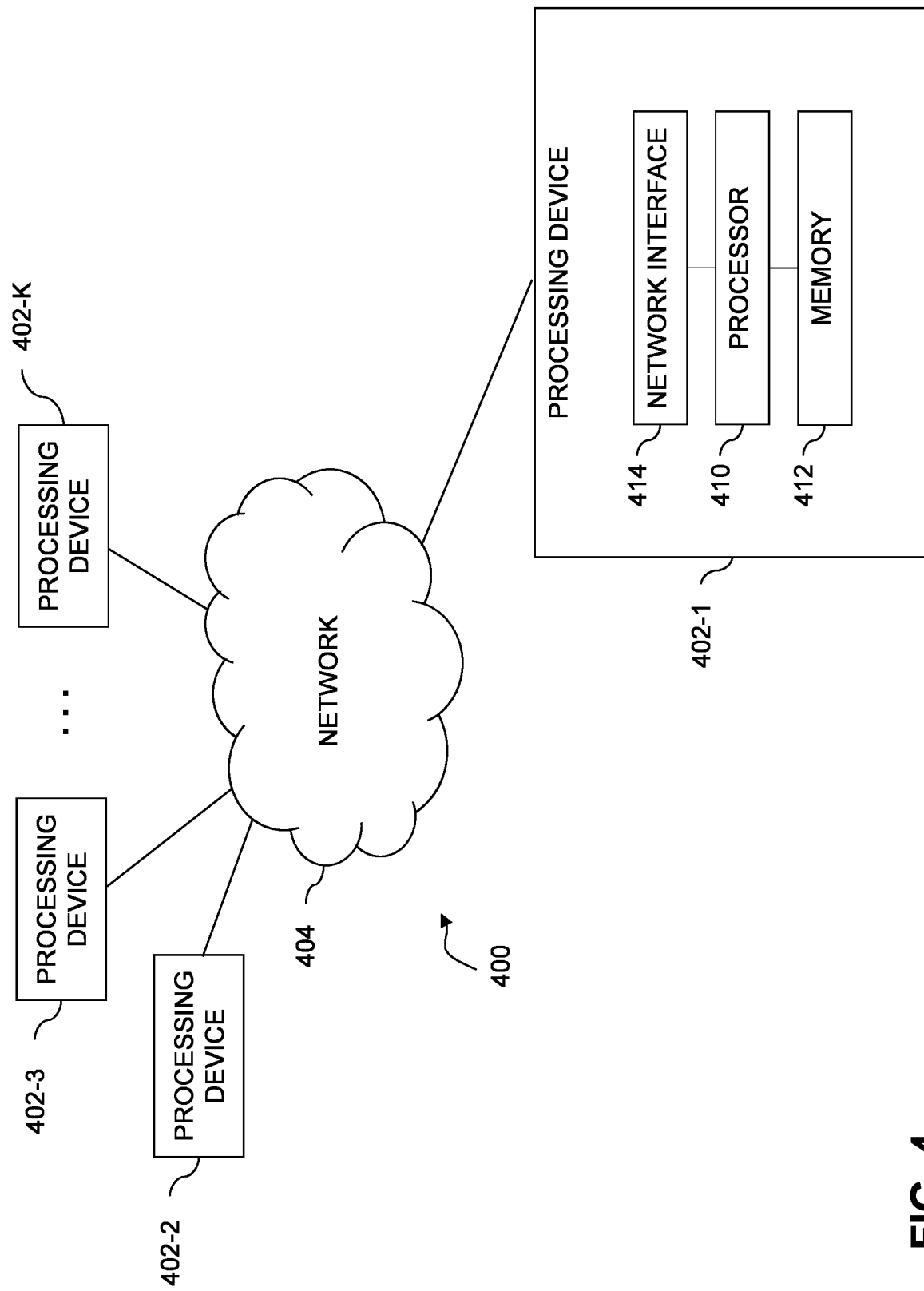

As is apparent from the above, one or more of the processing modules or other components of the information processing system 100 may each run on a computer, server, storage device or other processing platform element. A given such element is viewed as an example of what is more generally referred to herein as a "processing device." The cloud infrastructure 300 shown in FIG. 3 may represent at least a portion of one processing platform. Another example of such a processing platform is processing platform 400 shown in FIG. 4.

The processing platform 400 in this embodiment comprises a portion of the information processing system 100 and includes a plurality of processing devices, denoted 402-1, 402-2, 402-3, . . . 402-K, which communicate with one another over a network 404.

The network 404 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 402-1 in the processing platform 400 comprises a processor 410 coupled to a memory 412.

The processor 410 comprises a microprocessor, a microcontroller, an application-specific integrated circuit (ASIC), a field-programmable gate array (FPGA) or other type of processing circuitry, as well as portions or combinations of such circuitry elements.

The memory 412 comprises random access memory (RAM), read-only memory (ROM) or other types of memory, in any combination. The memory 412 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 402-1 is network interface circuitry 414, which is used to interface the processing device with the network 404 and other system components, and may comprise conventional transceivers.

The other processing devices 402 of the processing platform 400 are assumed to be configured in a manner similar to that shown for processing device 402-1 in the figure.

Again, the particular processing platform 400 shown in the figure is presented by way of example only, and the information processing system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of a distributed processing system in an illustrative embodiment include all-flash and hybrid flash storage arrays, scale-out all-flash storage arrays, scale-out NAS clusters, or other types of storage arrays. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing devices, modules, systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method comprising:
    monitoring, by a continuous deployment module, configuration deployment file changes in a software configuration management system, wherein the software configuration management system comprises a source repository and a target platform;
    creating a microservice application in a namespace, wherein the microservice application mounts a configmap representation, to access the configuration values embedded within a configmap object;
    detecting, by the continuous deployment module, modification of a configuration deployment file on the source repository; and
    deploying at least one microservice application on the target platform based on a directory in the source repository in which the modified configuration deployment file was detected, wherein a configuration manager creates a dictionary by merging configuration map objects from the modified configuration deployment file by creating a single dictionary for the microservice application to use during runtime;
    joining multiple configuration map objects to produce the single dictionary, wherein the configuration manager contains logic to create and merge configuration map objects;
    nesting configuration keys within the dictionary according to a hierarchy specified by filenames comprising delimited named tiers of the hierarchy; and
    resolving conflicts between the configuration map objects by applying a defined naming convention to determine which configuration map object overwrites another configuration map object,
    wherein the configmap object of the configuration map objects is obtained from the dictionary to access the configuration values, and wherein the microservice application works with the single dictionary as if the microservice application has loaded a single configmap object, wherein the method is implemented by at least one processing device comprising a processor coupled to a memory.

2. The method of claim 1 wherein deploying the at least one microservice application on the target platform comprises:
    determining which microservice applications to deploy and business units in which to deploy the microservice applications based on the directory in the source repository in which the modified configuration deployment file was detected.

3. The method of claim 1 wherein the modification of the configuration deployment file comprises modification of the configuration values and wherein deploying the at least one microservice application on the target platform comprises:
    determining the at least one microservice application to deploy based on whether the at least one microservice application utilizes the modified configuration values.

4. The method of claim 1 further comprising:
    restarting the at least one deployed microservice application upon detecting, by the continuous deployment module, the modification of the configuration deployment file on the source repository.

5. The method of claim 1 further comprising:
    overwriting the configuration values in the configuration deployment file; and
    restarting the at least one deployed microservice application upon detecting, by the continuous deployment module, the modification of the configuration deployment file on the source repository.

6. The method of claim 1 wherein the source repository comprises a global directory comprising global configuration values for global microservice applications, wherein a plurality of the global microservice applications deployed across a plurality of business units each utilizes a common global configuration value.

7. The method of claim 6 wherein detecting, by the continuous deployment module, the modification of the configuration deployment file on the source repository comprises:
    creating the global directory on the source repository for all global microservice applications deployed on the target platform.

8. The method of claim 1 wherein the source repository comprises group directories comprising group configuration values for group microservice applications, wherein a plurality of the group microservice applications deployed in a business unit each utilizes a common group configuration value.

9. The method of claim 8 wherein detecting, by the continuous deployment module, the modification of the configuration deployment file on the source repository comprises:
    creating a group directory on the source repository for each business unit in which microservice applications are deployed.

10. The method of claim 1 wherein the source repository comprises single group directories comprising single group configuration values for single group microservice applications, wherein a single group microservice application deployed in a business unit utilizes a single group configuration value.

11. The method of claim 1 wherein the source repository comprises single microservice application directories comprising single microservice application configuration values for single microservice applications, wherein a plurality of single microservice applications deployed in a plurality of business units each utilizes a common single microservice application configuration value.

12. The method of claim 11 wherein detecting, by the continuous deployment module, the modification of the configuration deployment file on the source repository comprises:
    creating a single microservice application directory on the source repository for each microservice application deployed.

13. The method of claim 1 wherein monitoring, by the continuous deployment module, the configuration deployment file changes comprises:

creating, by the continuous deployment module, deployment applications on the target platform for each business unit in which microservice applications are deployed.

14. The method of claim 13 further comprising:
pointing each deployment application to a respective configmap representation on the source repository, wherein the configmap representation comprises the configuration values; and
deploying the deployment application in the namespace on the target platform.

15. The method of claim 13 further comprising:
creating a business unit global application to monitor a global directory for changes to the global directory.

16. The method of claim 13 further comprising:
creating a business unit group application to monitor a group directory for changes to the group directory.

17. The method of claim 13 further comprising:
creating a single group application to monitor a single group directory for changes to the single group directory.

18. A system comprising:
at least one processing device comprising a processor coupled to a memory;
the at least one processing device being configured:
to monitor, by a continuous deployment module, configuration deployment file changes in a software configuration management system, wherein the software configuration management system comprises a source repository and a target platform;
to create a microservice application in a namespace, wherein the microservice application mounts a configmap representation, to access configuration values embedded within a configmap object;
to detect, by the continuous deployment module, modification of a configuration deployment file on the source repository; and
to deploy at least one microservice application on the target platform based on a directory in the source repository in which the modified configuration deployment file was detected, wherein a configuration manager creates a dictionary by merging configuration map objects from the modified configuration deployment file by creating a single dictionary for the microservice application to use during runtime;
joining multiple configuration map objects to produce the single dictionary, wherein the configuration manager contains logic to create and merge the configuration map objects;
nesting configuration keys within the dictionary according to a hierarchy specified by filenames comprising delimited named tiers of the hierarchy; and
resolving conflicts between the configuration map objects by applying a defined naming convention to determine which configuration map object overwrites another configuration map object,
wherein the configmap object of the configuration map objects is obtained from the dictionary to access the configuration values, and
wherein the microservice application works with the single dictionary as if the microservice application has loaded a single configmap object.

19. A computer program product comprising a non-transitory processor-readable storage medium having stored therein program code of one or more software programs, wherein the program code when executed by at least one processing device causes said at least one processing device:
to monitor, by a continuous deployment module, configuration deployment file changes in a software configuration management system, wherein the software configuration management system comprises a source repository and a target platform;
to create a microservice application in a namespace, wherein the microservice application mounts a configmap representation, to access configuration values embedded within a configmap object;
to detect, by the continuous deployment module, modification of a configuration deployment file on the source repository; and
to deploy at least one microservice application on the target platform based on a directory in the source repository in which the modified configuration deployment file was detected, wherein a configuration manager creates a dictionary by merging configuration map objects from the modified configuration deployment file by creating a single dictionary for the microservice application to use during runtime;
joining multiple configuration map objects to produce the single dictionary, wherein the configuration manager contains logic to create and merge the configuration map objects;
nesting configuration keys within the dictionary according to a hierarchy specified by filenames comprising delimited named tiers of the hierarchy; and
resolving conflicts between the configuration map objects by applying a defined naming convention to determine which configuration map object overwrites another configuration map object,
wherein the configmap object of the configuration map objects is obtained from the dictionary to access the configuration values, and
wherein the microservice application works with the single dictionary as if the microservice application has loaded a single configmap object.

* * * * *